(12) United States Patent
Khayrallah (10) Patent No.: US 8,229,040 B2
(45) Date of Patent: Jul. 24, 2012

(54) FEEDFORWARD RECEIVER AND METHOD FOR REDUCING INTER-SYMBOL INTERFERENCE BY USING JOINT SOFT VALUES

(75) Inventor: Ali S. Khayrallah, Cary, NC (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 775 days.

(21) Appl. No.: 12/342,470

(22) Filed: Dec. 23, 2008

(65) Prior Publication Data

US 2010/0158085 A1    Jun. 24, 2010

(51) Int. Cl.
*H04L 27/06* (2006.01)
(52) U.S. Cl. ........ 375/341; 375/222; 375/260; 375/262; 375/265; 375/316; 375/340; 375/348; 714/792; 714/794; 714/795; 714/796
(58) Field of Classification Search .................. 375/222, 375/260, 265, 316, 340, 341, 348, 262; 714/792, 714/794–796
See application file for complete search history.

(56) References Cited

U.S. PATENT DOCUMENTS

| | | | |
|---|---|---|---|
| 6,269,116 B1 * | 7/2001 | Javerbring et al. ............ | 375/229 |
| 6,697,441 B1 * | 2/2004 | Bottomley et al. ............ | 375/340 |
| 6,798,852 B2 * | 9/2004 | Khayrallah et al. .......... | 375/341 |
| 2005/0018794 A1 * | 1/2005 | Tang et al. ..................... | 375/341 |
| 2006/0109935 A1 * | 5/2006 | McQueen et al. ............. | 375/340 |

FOREIGN PATENT DOCUMENTS

WO    WO 01/95549 A2    12/2001

OTHER PUBLICATIONS

L. Bahl, J. Cocke, F. Jelinek, and J. Raviv, "Optimal decoding of linear codes for minimizing symbol error rate," IEEE Trans. Inform. Thy., Mar. 1974, pp. 284-287.
C. Berrou, A. Glavieux and P. Thitimajshima, "Near Shannon Limit Error-Correcting Coding and Decoding: Turbo-Codes", Proceedings IEEE ICC, 1993.
F. Glaschiodt, "Feedforward decoding using joint probabilities," Master's thesis at the Royal Institute of Technology, Stockholm, 2000.
J. Hagenauer, "Rate-compatible punctured convolutional codes (RCPC codes) and their applications," IEEE Trans. Commun., Apr. 1988, pp. 389-400.
A. Khayrallah and G. Bottomley, "Joint probability in demodulation and decoding," *Proceedings Conference on information Sciences and Systems*, 2001.

* cited by examiner

*Primary Examiner* — Sam K Ahn
*Assistant Examiner* — Sophia Vlahos (57) ABSTRACT

A feedforward receiver and method are described herein that address inter-symbol interference in received symbols by using an enhanced equalizer to generate joint soft values (joint information of a previous modem bit x' and a modem bit x) and an enhanced decoder which uses the joint soft values and side information (bias about the previous modem bit x') to output a more reliable information bit x.

24 Claims, 5 Drawing Sheets

FEEDFORWARD RECEIVER AND METHOD FOR REDUCING INTER-SYMBOL INTERFERENCE BY USING JOINT SOFT VALUES

TECHNICAL FIELD

The present invention relates in general to the wireless telecommunications field and, in particular, to a feedforward receiver that handles and exploits inter-symbol interference in received symbols by using an enhanced equalizer to generate joint soft values (joint information of a previous modem bit x' and a modem bit x) and an enhanced decoder which uses the joint soft values and side information (bias about the previous modem bit x') to output a more reliable information bit x.

BACKGROUND

Figure 1:
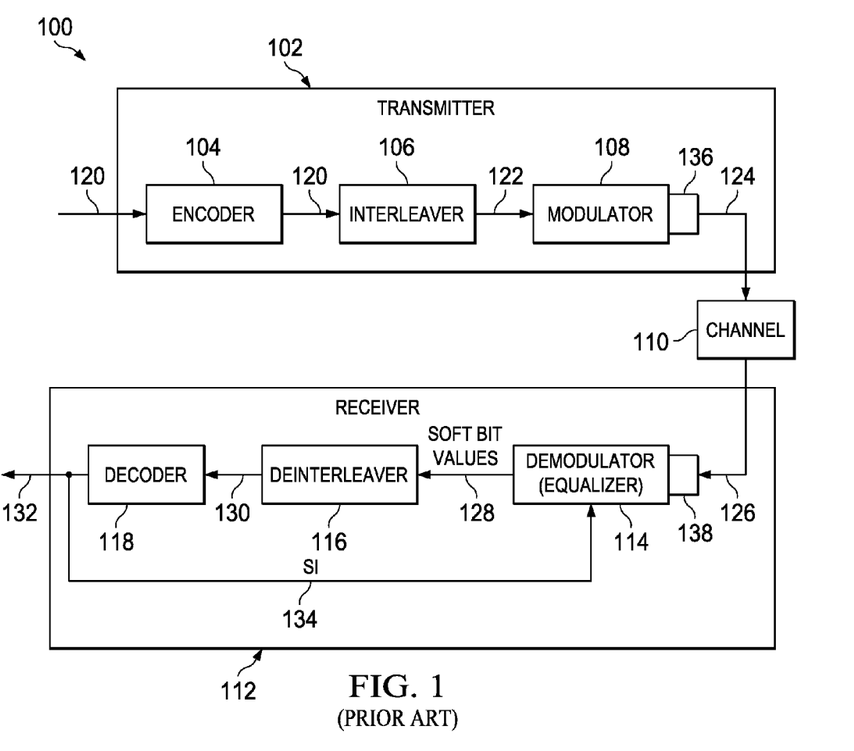
FIGS. 1-4 (PRIOR ART) are various diagrams including a traditional wireless communications system and a traditional turbo receiver which is used to help explain various problems associated with demodulating and decoding a received symbol that are solved by the present invention.

The following abbreviations are herewith defined, at least some of which are referred to within the following description of the state-of-the-art and the present invention.
8PSK 8 Phase-Shift Keying
AWGN Additive White Gaussian Noise
AFC Automatic Frequency Control
BCH Bose Chaudhuri and Hocquenghem
BPSK Binary Phase Shift Keying
EDGE Enhanced Data GSM Environment
GMSK Gaussian Minimum Shift Keying
GSM Global System for Mobile Communications
IS-136 Interim Standard-136
ISI Inter-Symbol Interference
ISV Input Soft Values
JSV Joint Soft Values
LDPC Low Density Parity Check Code
LTE Long Term Evolution
MAP Maximum A Posteriori
MLSE Maximum Likelihood Sequence Estimation
OSV Output Soft Value
PSK Phase-Shift Keying
QAM Quadrature Amplitude Modulation
SI Side Information
SNR Signal-To-Noise Ratios
SOVA Soft-Output Viterbi Algorithm
SSV Single Soft Value
WCDMA Wideband Code Division Multiple Access Referring to FIG. 1 (PRIOR ART), there is a basic diagram of a traditional wireless communication system 100 with a transmitter 102 (including an encoder 104, an interleaver 106 and a modulator 108) coupled by a channel 110 to a receiver 112 (including a demodulator 114, a deinterleaver 116 and a decoder 118). In operation, the encoder 104 receives a block of information bits 120 and protects those bits by mapping them into a larger block of modem bits 122. The encoder 104 can perform this by using an error control code such as a binary code, for example a BCH code, a LDPC code, a convolutional code, or a turbo code. The interleaver 106 receives the modem bits 120, changes the order/indices of the modem bits 120, and outputs re-ordered bits 122.

The modulator 108 receives the re-ordered bits 122 and uses a modulation constellation to output symbols 124. In particular, the modulator 108 uses the modulation constellation to map q consecutive bits into one of Q modulation symbols when generating the output symbols 124, where $Q=2^q$. For instance, the modulator 108 can use a modulation constellation such as BPSK, with q=1 and Q=2, and 8PSK, with q=3 and Q=8. The modulator 108 may also perform a filtering operation to produce partial response signaling. In addition, the modulator 108 may also perform a coded modulation operation, where the mapping of the current q bits depends on previous bits. For simplicity, the description provided herein will assume an un-coded modulation scheme.

The channel 110 represents the effects of fading in a wireless medium, time dispersion, as well as additive noise and interference on the transmitted symbols 124. Thus, the demodulator 114 receives a signal 126 which has been subjected to ISI. The ISI may be due to the time dispersion over the wireless channel 110 and to the combined effects of partial response signaling and filtering at the transmitter 102 and filtering at the receiver 112.

The receiver 112 performs the demodulation operation and the decoding operation separately. First, the demodulator 114 accepts the received signal 126, handles the ISI, and outputs estimates of the modem bits 112 in the form of soft bit values 128. The soft bit values 128 indicate the reliability of individual modem bits 112. The deinterleaver 116 receives the soft bit values 128 and changes their order/indices to be the reverse of that used by the interleaver 106. After de-interleaving, the re-ordered soft bit values 130 are fed to the decoder 118. The decoder 118 operates on the re-ordered soft bit values 130 to produce an estimate 132 of the information bits 120. Although, the deinterleaver 116 (and the corresponding interleaver 106) plays an important role in the performance of the wireless communication system 100, in the present context it is cumbersome and not relevant to the discussion herein to explicitly deal with the deinterleaver 116. Thus, from this point on it is assumed that the function of the deinterleaver 116 which is to change the order/indices in modem bits is handled properly and as a result the deinterleaver 116 will be absent in the following discussion and will not be illustrated in any of the remaining figures.

Figure 2:
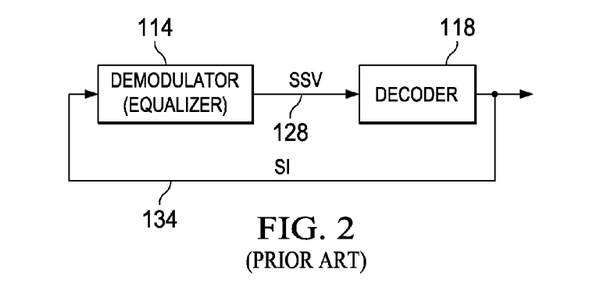

The separation of the demodulator 114 and the decoder 118 is not optimal, but it does allow for reasonable complexity in the receiver 112. It is well known from information theory that an optimal receiver 112 jointly performs the operations of demodulation and decoding. Unfortunately, the complexity of such a joint operation of the demodulation and decoding is generally exorbitant. But, it is possible to bridge part of the gap between the separate demodulation and decoding processes by using some form of interaction between the demodulator 114 and the decoder 118. One known technique is to feed back side information 134 from the decoder 118 to the demodulator 114, and iterate their respective processes a number of times. FIG. 2 (PRIOR ART) is a diagram of such a receiver 112 that implements this feedback technique which is known in the industry as a turbo receiver 112. The turbo receiver 112 has been tested in wireless communication systems 100 based on IS-136, GSM/EDGE, and WCDMA, with nice gains but at the expense of significant complexity increases.

The turbo receiver 112 works well but the re-use of the demodulator 114 is wasteful. For instance, in many wireless communication systems 100 such as GSM/EDGE, the demodulator 114 is an equalizer, which dominates the complexity of the receiver 112. In particular, the equalizer 114 has multiple tasks that may be hard to dissociate since in addition to the main task of dealing with the ISI, the equalizer 114 may also handle channel tracking, AFC, noise whitening, etc. Plus, the storing of data required to re-run the equalizer 114 over and over in subsequent passes might be a problem. For instance, in EDGE, the decoder 118 accepts data from 4 bursts and to iterate between the decoder 118 and the equalizer 114, the received values for the 4 bursts would need to be stored.

One type of equalizer 114 that is used today is known as a Viterbi equalizer 114 which produces soft bit values 128 utilizing what is known as the "cheap SOVA" technique. Prior to describing the Viterbi equalizer 114 and the cheap SOVA technique it will first help to describe the model of the channel 110 in the wireless communication system 100. In this example, assume the transmitter 102 has a single transmit antenna 136 (but it could have multiple transmit antennas 136) and the receiver 112 has a single receive antenna 138 (but it could have multiple receive antennas 138). For a symbol-spaced channel 110 with memory M, there are M+1 channel taps $H_M, \Lambda, H_0$, where $H_1$ describes the channel 110 at a delay of 1 symbols. The transmitted symbols 124 and received symbols 126 at index k are denoted $s_k$ and $r_k$, respectively. The system model is given by:

$$r_k = H_M s_{k-M} + \Lambda + H_1 s_{k-1} + H_0 s_k + v_k \quad (1)$$

where $v_k$ represents the noise and by default assume this is an additive white Gaussian noise (AWGN) model.

Figure 3:
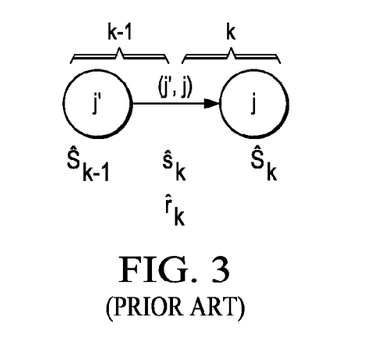

The Viterbi equalizer 114 due to ISI needs to find the best sequence of symbols simultaneously. To accomplish this, the Viterbi equalizer 114 operates on a trellis which has L stages, indexed 0 to L with $Q^M$ states, and $Q^{M+1}$ branches per stage. The Viterbi equalizer 114 is fed L received values $r_1, \Lambda, r_L$. The Viterbi state transition at time k is summarized in FIG. 3 (PRIOR ART). At index k, the Viterbi state represents M symbols as follows:

$$\hat{S}_k = (\hat{s}_{k-M+1}, \Lambda, \hat{s}_k) \quad (2).$$

Stage k of the trellis describes the progression from state $\hat{S}_{k-1}$ to state $\hat{S}_k$. The branch from $\hat{S}_{k-1}$ to $\hat{S}_k$ represents the symbol $\hat{s}_k$. Note that for the ISI trellis, all branches ending in $\hat{S}_k$ share the same symbol. Also note that their starting states $\hat{S}_{k-1} = (\hat{s}_{k-M}, \Lambda, \hat{s}_{k-1})$ each have a distinct oldest symbol $\hat{s}_{k-M}$. For notational simplicity, the states have been labeled at each stage by an integer j between 0 and $q^M - 1$. Each j represents a distinct value of $\hat{S}_k$. A branch is labeled by its starting and ending state pair (j',j). For each state j, the fan-in l(j) and the fan-out O(j) are the set of incoming and outgoing branches, respectively. For the ISI trellis, all fan-in and fan-out sets have the same size Q.

For a branch with symbol $\hat{s}_k$ in the fan-out of state $\hat{S}_{k-1}$, the hypothesized received value is given by:

$$\hat{r}_k = H_M \hat{s}_{k-M} + \Lambda + H_0 \hat{s}_k \quad (3).$$

The received value $r_k$ is compared to $\hat{r}_k$ to get the branch metric as follows:

$$f_k = \|r_k - \hat{r}_k\|^2 \quad (4).$$

The branch metric has been explicitly labeled herein with the corresponding branch where necessary.

Without much loss of generality, it is assumed that the trellis starts at time 0 in state 0 and that the state metric computation proceeds forward from there. Thus, at time k, the state, or cumulative, metric $F_k(j)$ of state j is given in terms of the state metrics at time k−1 and the branch metrics at time k are as follows:

$$F_k(j) = \min_{j' \in l(j)} (F_{k-1}(j') + f_k(j', j)). \quad (5)$$

In addition, the state in l(j) that achieves the minimum is called the predecessor of state j, and denoted $\pi_{k-1}(j)$. Also, the oldest symbol $\hat{s}_{k-M}$ in the corresponding M-tuple $\hat{S}_{k-1}$ is the tentative symbol decision looking back from state j at time k.

Furthermore it is possible to trace back a sequence of the states to time 0, by following the chain $\lambda_{k-1}(j), \pi_{k-2}(\lambda_{k-1}(j))$, etc. The corresponding symbols $\hat{s}_{k-m}, \hat{s}_{k-M-1}$, etc. are the tentative decisions of the MLSE when looking back from state j at time k. In general, looking back from different states at a certain stage, the decisions tend to agree more with the older the symbols. That is, the longer the delay for a decision, the better. Typically, there is a chosen delay decision D. The decision about the best state at stage k is made by tracing back from the state with the smallest state metric among the states at stage k+D (or at the last stage L, if L<k+D).

After the trace back, the best state at stage k is denoted φ. Looking back at its predecessor state $\pi_{k-1}(\phi)$, the oldest symbol $\hat{s}_{k-M}$ is considered corresponding to that state. There are q information bits that map into that symbol. A soft value 128 is computed for one of those bits, denoted x. For clarity, this soft value 128 is referred to herein as a single soft value (SSV). As discussed above, the modulation symbols are used to form the synthesized received values $\hat{r}_k$, which produce the branch metric $f_k$ and state metric $F_k(j)$. The focus of this discussion will now be on the information bit x.

The cheap SOVA technique for SSV generation has been tested extensively and implemented in products. It is surprisingly accurate and much less complex compared to MAP and SOVA techniques. The cheap SOVA technique is described herein first for a binary modulation, with q=1 and Q=2. For instance, the GMSK mode of GSM can be treated as a binary modulation. For Q=2, the standard binary trellis has 2 ending branches per state, and 2 starting branches per state. Since q=1, there is a single information bit x mapping into the binary symbol $\hat{s}_{k-M}$.

Figure 4:
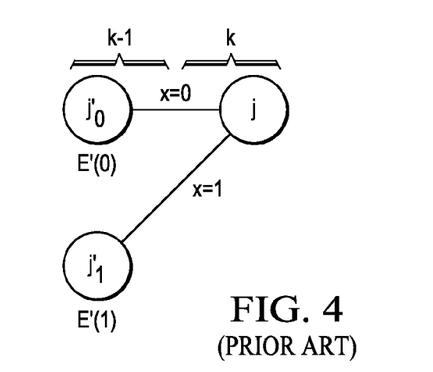

Referring to FIG. 4 (PRIOR ART), an isolated piece of the trellis is shown which has two branches that end in φ (assume j=φ). At index k−1, the two states connecting to φ, represent the potential decision about information bit x. The two states are denoted $j'_x$ according to their corresponding x values. To aid in the subsequent discussion about the present invention, a modified notation for the state metrics is used where $E(\phi) = F_k(\phi)$, and:

$$E'(x) = F_{k-1}(j'_x) + f_k(j'_x, \phi) \quad (6).$$

Then, the state metric recursion (5) can be written as:

$$E(\phi) = \min(E'(0), E'(1)) \quad (7).$$

According to the cheap SOVA technique, the SSV 128 for modem bit x is given by:

$$\lambda = E'(1) - E'(0) \quad (8).$$

Thus a negative (positive) value of λ indicates that information bit x is 1 (0). The aforementioned discussion described in detail the traditional turbo receiver 112 and its drawbacks such as its large complexity and large delay in the processing due to the feedback even when the Viterbi equalizer 114 and the cheap SOVA technique are used. Accordingly, there is a need for a new type of receiver that addresses these drawbacks and other drawbacks of the conventional turbo receiver. These needs and other needs are satisfied by the present invention.

SUMMARY

In one aspect, the present invention provides a feedforward receiver which includes: (a) an equalizer that receives a symbol and outputs a joint soft value which includes joint information of a modem bit x and a previous modem bit x'; (b) a fusion function that receives the joint soft value and outputs an input soft value for the previous modem bit x'; (c) a decoder that receives the input soft value for the previous modem bit x' and outputs an output soft value for the previous modem bit x'; (d) a modification unit (e.g., subtraction unit) that uses the input soft value for the previous modem bit x' and the output soft value for the previous modem bit x' to generate side information which is in a form of a bias about the previous modem bit x'; and (e) the fusion function that receives the side information and processes the side information and the joint soft value to generate an improved single soft value for modem bit x. The feedforward receiver has a structure where which once the equalizer outputs the joint soft value it is not revisited again during the decoding process, which avoids the undesirable reuse of the equalizer.

In another aspect, the present invention provides a method for handling and exploiting inter-symbol interference in a received symbol by: (a) receiving the symbol; (b) generating a joint soft value which includes joint information of a modem bit x and a previous modem bit x'; and (c) using the joint soft value and side information which is in a form of a bias about the previous modem bit x' (or modem bit x) to generate an improved single soft value for modem bit x (or previous modem bit x'). In this case, an equalizer is used in the generating step to generate the joint soft value and is not used again during the using step in which a decoder is used to generate an improved single soft value for modem bit x (or previous modem bit x').

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 5:
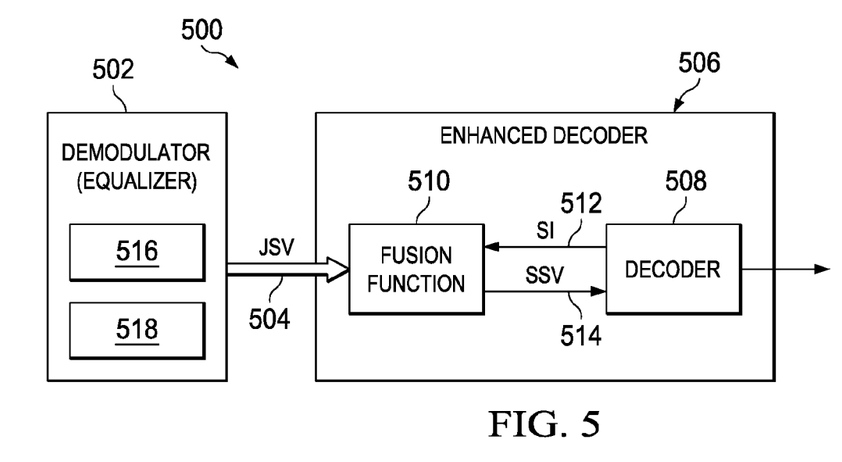
FIG. 5 is a basic diagram of a receiver that can be implemented in a wireless communication system (namely a base station or a user terminal) in accordance with an embodiment of the present invention.

Referring to FIG. 5, there is a basic diagram of a receiver 500 configured in accordance with an embodiment of the present invention. The receiver 500 deals with ISI and aims to boost performance by having an enhanced equalizer 502 (demodulator 502) that generates joint soft values (JSV) 504 for multiple bits from different stages therein and then forwards the JSV 504 to an enhanced decoder 506. In one embodiment, the enhanced equalizer 502 generates the JSV 504 (modem bits x' and x) by using an extension of the cheap SOVA. The enhanced decoder 506 has a decoder 508 and a fusion function 510. The fusion function 510 accepts the JSV 504 from the equalizer 502 and side information 512 from the decoder 508 and then outputs a soft bit value (SSV) 514 for modem bit x to the decoder 508. This scheme is desirable since it enables the receiver 500 to leave a structure that is feedforward only and thus it can avoid the undesirable reuse of the equalizer 502. In contrast, the traditional turbo receiver 112 has a feedback structure where the equalizer 114 receives side information 134 from the decoder 118 (see FIG. 2).

In one embodiment, the receiver 500 could preferably be implemented in a GSM/EDGE wireless communication system due to the system's evolution to higher rates which requires high signal-to-noise ratios (SNR) in which boosting the performance of the receiver 500 is important as it enables better high rate coverage throughout the cell. More generally, the receiver 500 could be implemented within any wireless communication system with ISI. For instance, the receiver 500 can be used in a scenario where a LTE uplink effectively uses a single carrier format. In describing the present invention, the receiver 500 is discussed in detail below as generating the JSV 504 for a binary modulation case and then it is discussed relative to higher modulation cases. Following that, the receiver 500 is described by looking at the interaction between the JSV 504 and the enhanced decoder 506.

A. Joint Soft Value

Figure 6:
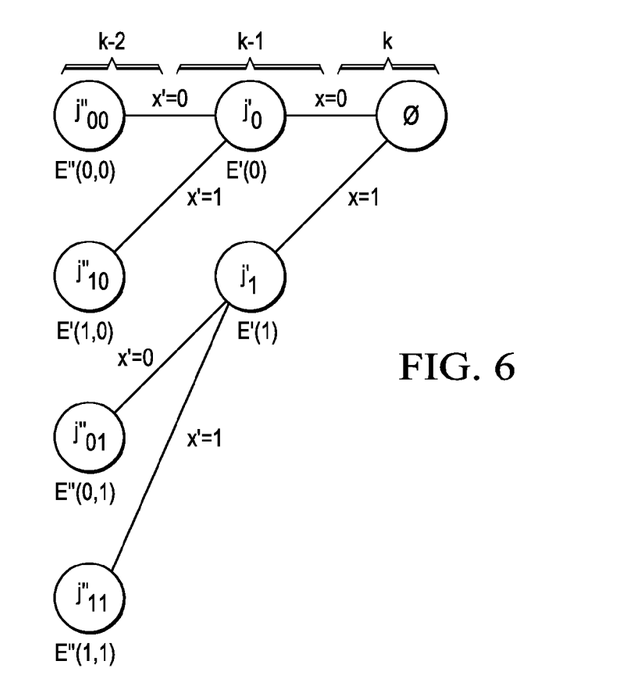
FIG. 6 is an illustration of an isolated piece of a trellis which is used to help describe how the receiver shown in FIG. 5 and in particular an equalizer located therein generates joint soft values in accordance with an embodiment of the present invention.

Referring to FIG. 6, an isolated piece of a trellis which represents a potential decision about information bit x is shown and used to help describe how the receiver 500 and in particular the equalizer 502 generates the JSV 504 in accordance with an embodiment of the present invention. In this trellis, the φ has been identified as the best state at index k while four states which connect to φ are shown looking back to index k−2. The 4 states at index k−2 are denoted $j''_{x',x}$ according to their corresponding x' and x values. This small trellis section has been isolated and shown to highlight the fact that no other parts of the trellis are involved in the determination of the JSV 504. In this embodiment, equalizer 502 considers not only the modem bit x at index k but also the previous modem bit X' at index k−1 when generating the JSV 504. The pair (x', x) has joint information which is not reflected by their respective SSVs but is captured for the JSV 504. An example of how the equalizer 502 can use the pair (x',x) to generate the JSV 504 is discussed next. In a later section a discussion is provided to explain one way of exploiting the JSV 504 in the pair (x', x) by fusing it with side information 512 about the previous information bit x' to improve the knowledge about the other modem bit x.

To obtain the JSV 504, the equalizer 502 has one or more processors 516 and at least one memory 518 (storage 518) that includes processor-executable instructions where the one or more processors 516 are adapted to interface with the at least one memory 518 and execute the processor-executable instructions to generate the JSV 504 by working with the progression of the state metric over 2 stages, from stage k−2 to stage k (note: the one or more processors 516 and the at least one memory 518 are implemented, at least partially, as software, firmware, hardware, or hard-coded logic). In this example, the state metric has four new quantities, indexed by (x',x), given by:

$$E''(x',x) = F_{k-2}(j''_{x',x}) + f_{k-1}(j''_{x',x}, j'_x) + f_k(j'_x, \phi) \qquad (9).$$

As can be seen, these four new quantities describe state metric candidates for φ, starting at index k−2, instead of k−1, as in equation no. 5. The set of four values of E"(x',x) makes up the JSV 504 information in that they contain all the information that is needed about x' and x. For instance, note that:

$$\min(E''(0, x), E''(1, x)) = \min(F_{k-2}(j''_{0,x}) + \qquad (10)$$
$$f_{k-1}(j''_{0,x}, j'_x), F_{k-2}(j''_{1,x}) + f_{k-1}(j''_{1,x}, j'_x)) + f_k(j'_x, \phi)$$
$$= F_{k-1}(j'_x) + f_k(j'_x, \phi)$$
$$= E'(x).$$

Also $$\min_x \left\{ \min_{x'} \{E''(x', x)\} \right\} = \min_x \{E'(x)\} \qquad (11)$$
$$= \min_x \{F_{k-1}(j'_x) + f_k(j'_x, \phi)\}$$
$$= F_k^x(\phi)$$
$$= E(\phi).$$

Similarly, $$E''(1, x) - E''(0, x) = (F_{k-2}(j''_{1,x}) + f_{k-1}(j''_{1,x}, j'_x) + \qquad (12)$$
$$f_k(j'_x, \phi)) - (F_{k-2}(j''_{0,x}) + f_{k-1}(j''_{0,x}, j'_x) + f_k(j'_x, \phi))$$
$$= (F_{k-2}(j''_{1,x}) + f_{k-1}(j''_{1,x}, j'_x)) - (F_{k-2}(j''_{0,x}) + f_{k-1}(j''_{0,x}, j'_x)).$$

which is the SSV for bit x' if $\pi_{k-1}(\phi)$ is equal to $j'_x$. It also follows that equation nos. 7 and 8 can be written as:

$$E(\phi) = \min(E''(0,0), E''(1,0), E''(0,1), E''(1,1)) \qquad (13).$$

$$\lambda = \min(E''(0,1), E''(1,1)) - \min(E''(0,0), E''(1,0)) \qquad (14).$$

As such, equation nos. 13 and 14 are only intermediate steps in the evaluation of equations nos. 7 and 8. As a result of this, the JSV 504 can be used with the side information 512 which is in the form of a bias about bit x' to refine the receiver's knowledge of bit x. This is also desirable since once the equalizer 502 outputs the JSV 504 it does not need to be revisited again as was the case in the prior art. Hence, the feedforward structure of the receiver 500.

B. Side Information

In the present context, the side information (SI) 512 about bit x' comes from the decoder 508, as will be explained in detail below. The SI 512 can be expressed as an additive bias term μ', where a positive (negative) value of μ' indicates a bias towards x'=1 (0). The bias term μ' can be incorporated into the candidate metrics by adding it to the two metrics with X'=0, yielding:

$$\hat{E}''(0,x) = E''(0,x) + \mu' \qquad (15).$$

The other two metrics remain unchanged:

$$\hat{E}''(1,x) = E''(1,x) \qquad (16).$$

The SI 512 for bit x' is used to improve the decision about its neighboring bit x. The biased SSV can be modified accordingly as follows:

$$\hat{\lambda} = \min(\hat{E}''(0, 1), \hat{E}''(1, 1)) - \min(\hat{E}''(0, 0), \hat{E}''(1, 0)) \qquad (17)$$
$$= \min(E''(0, 1) + \mu', E''(1, 1)) -$$
$$\min(E''(0, 0) + \mu', E''(1, 0)).$$

The state metric can also be recomputed as follows:

$$\hat{E}(\phi) = \min(E''(0,0) + \mu', E''(1,0), E''(0,1) + \mu', E''(1,1)) \qquad (18).$$

This indicates that the SI 512 (μ') may cause a different decision about bit x. The effect of the biased SI 512 can be illustrated with a simple example, shown in TABLE #1.

TABLE #1

| (x', x) | E"(x', x) | μ' = 2<br>$\hat{E}''$(x', x) | μ' = −3<br>$\hat{E}''$(x', x) |
|---|---|---|---|
| (0, 0) | 1 | 3 | −2 |
| (1, 0) | 3 | 3 | 3 |
| (0, 1) | 5 | 7 | 2 |
| (1, 1) | 2 | 2 | 2 |
|  | λ = 1 | $\hat{\lambda}$ = −1 | $\hat{\lambda}$ = 4 |
|  | E(φ) = 1, x = 0 | Ê(φ) = 2, x = 1 | Ê(φ) = −2, x = 0 |

In the absence of the SI 512, the original unaided SSV for bit x is λ=1, indicating, that x=0. With a SI μ'=2 about bit x', the refined SSV for bit x is $\hat{\lambda}$=−1, changing the decision to x=1. With μ'=−3, $\hat{\lambda}$=4, strengthening the original decision x=0. As can be seen, the fusing of the biased SI 512 with the JSV 504 changes the SSV and the decision about bit x in non-trivial ways. In other words, without the JSV 504 there is no way to exploit the SI 512 about bit x' to help decode bit x.

Side Information for a Separate Decoder

Figure 7:
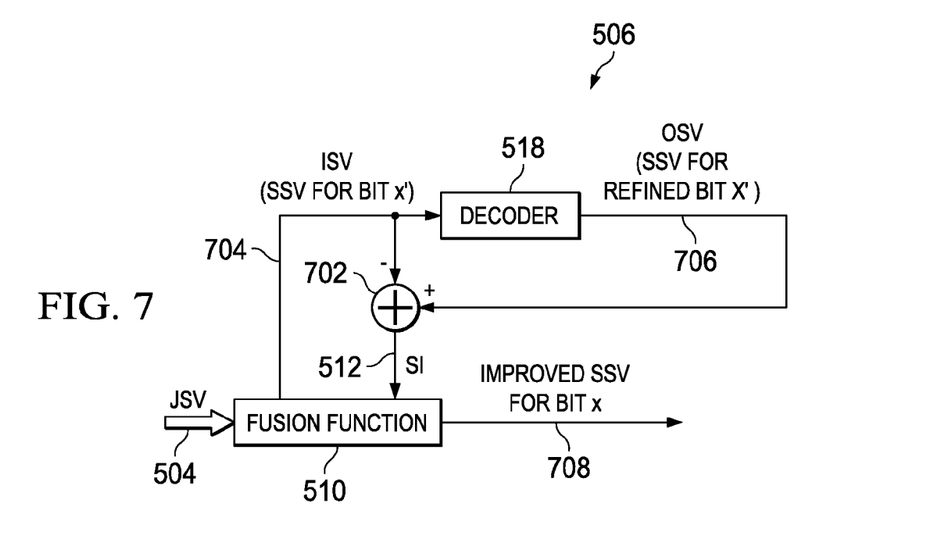
FIGS. 7-9 are diagrams of several different receivers which are configured in accordance with different embodiments of the present invention.

A scenario is considered next where the modem bit x' belongs to a codeword, while the modem bit x is either uncoded or belongs to a separate codeword. This scenario is relevant since there are existing error control schemes for speech coding available today is which use separate coding of different bit classes, or leave certain bits uncoded. Referring to FIG. 7, there is illustrated an embodiment of the enhanced decoder 506 which includes a decoder 508 and a fusion function 510 that can implement this scenario in accordance with an embodiment of the present invention. In this embodiment, the fusion function 510 receives the JSV 504 from the equalizer 502 and then processes the JSV 504 to output an ISV 704 (SSV for modem bit x') which is sent to the decoder 508 (note: the fusion function 510 (or any other unit) is able to process the JSV 504 and calculate the SSV for modem bit x and/or the SSV for modem bit x'). The fusion function 510 also receives the SI 512 (μ') from a subtracting unit 702 (e.g., modification unit) which generated the SI 512 by effectively subtracting at the appropriate position the ISV 704 from an OSV 706 which is output by the detector 508. Basically, the decoder 518 receives the ISV 704 and uses the structure of the code to generate the OSV 706 which is the SSV of the refined modem bit x' (a detailed discussion is provided below about how the detector 508 generates the OSV 706). This subtraction is performed to avoid an over-counting phenomenon, which has been identified in the study of turbo codes. Finally, the fusion function 510 processes the JSV 504 and the SI 512 and outputs an improved SSV 708 for modem bit x.

As can be seen, the enhanced decoder 506 uses a decoder variant in accordance with the present invention to produce refined modem bit SSVs 708 for the modem bits x'. This is in contrast to a standard decoder which simply outputs soft or hard values for the information bits z. For clarity, we denote by z the information bits that map into the codeword containing modem bit x'. In this example, the enhanced decoder 506 feeds the SI 512 to the fusion function 510 which produces improved SSVs for x where the improved SSVs replace the original SSVs for x. Thus, if bits x are uncoded, and actual information bits, then hard decisions on the improved SSVs produce the final estimates for x. If bits x are coded, then the improved SSVs are fed to the corresponding decoder, to produce the final information bits. Other techniques that can be adapted and used to help produce refined modem bit SSVs 708 include SOVA and cheap SOVA (for example). A MAP decoder variant in accordance with yet another embodiment of the present invention is described in a subsequent section.

Side Information in a Common Decoder

A scenario is now considered where the modem bits x' and x belong to the same codeword. This scenario can be addressed by a technique where the OSVs about early bits in the codeword are used to modify the ISVs for later positions in the codeword. Without much loss of generality, this technique is illustrated with a convolutional code, and the enhanced decoder 508 has a decision depth d. This means that after d stages, the decoder 506 produces OSVs for the modem bits corresponding to the first stage. After (d+1) stages, the decoder 506 produces OSVs for the modem bits of the second stage, and so on.

Figure 8:
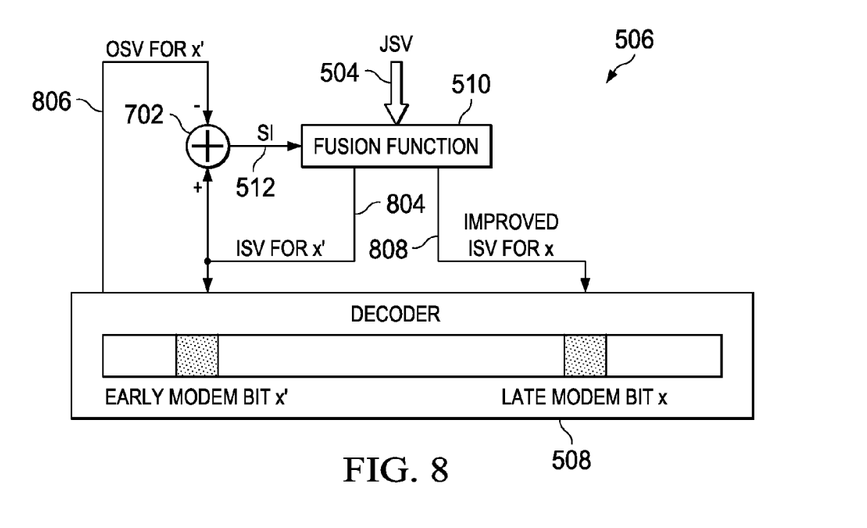

Referring to FIG. 8, there is illustrated an exemplary enhanced decoder 506 which is used to help explain this technique in greater detail in accordance with an embodiment of the present invention. In this embodiment, the fusion function 510 accepts the JSVs 504 from the equalizer 502. For the first d stages, the fusion function 510 feeds the original ISVs 804 for bit x' to the decoder 508. This requires the fusion function 510 to reduce the JSVs 544 to ISVs 804 according to equation no. 14. Alternatively, the ISVs 804 may be produced directly by the equalizer 502 according to equation no. 8 and fed to the fusion function 510. After d stages, the OSVs 806 for bit x' begin to come out of the decoder 508. Going back to original bit pair (x',x), assume that x' appears before x in the codeword, and that they are separated by d stages or more. Then the OSV 806 for modem bit x', and subsequently the SI 512 (µ') for modem bit x' is produced before the decoder 508 processes the ISV (λ) for modem bit x. Next, the subtraction unit 702 feeds is the SI 512 (µ') to the fusion function 510 which produces an improved ISV 808 ($\hat{\lambda}$) according to equation no. 17. Then, the improved ISV 808 ($\hat{\lambda}$) is substituted for ISV 804(λ) at the input to the decoder 508. Depending on the specific interleaver and the decision depth parameter d, a certain fraction of bits x get improved ISVs. This improves the overall performance of the enhanced decoder 506.

Iteration of the Decoder

Figure 9:
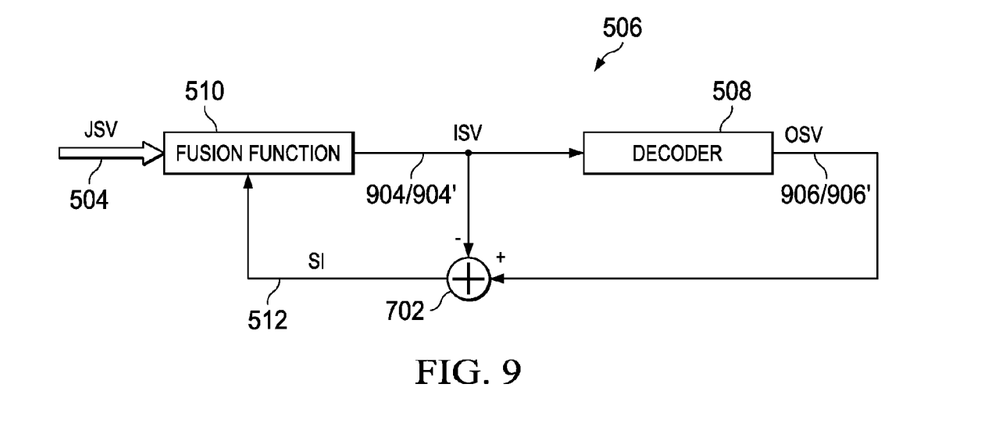

The scenario above where the modem bits x' and x both belong to the same codeword is considered again when discussing another embodiment of the present invention. In this embodiment, the decoder 508 is now used two or more times in block mode, in interaction with the JSV 504. By block mode, we mean that the decoder 508 interacts with the JSV 504 on a codeword block basis. This is in contrast to the previous case, where the interaction was within the codeword block. Referring to FIG. 9, there is illustrated an exemplary enhanced decoder 506 which is used to help explain this particular scenario in accordance with an embodiment of the present invention. In this embodiment, the fusion function 510 receives the JSVs 504 from the equalizer 502. Again, it should be noted that the equalizer 502 is not involved any further in this process. In the initial iteration, the decoder 508 accepts a block of original SSVs as ISVs 904, and produces a block of OSVs 906, resulting in a block of SIs 512 after the subtracting unit 702 subtracts the ISVs 904 from the OSVs 906. The SIs 512 are fed to the fusion function 510 which produces a block of new ISVs 904'. In the second iteration, the decoder 508 accepts the block of new ISVs 904', produces a block of new OSVs 906', and so on.

Higher Order Modulation

In this embodiment, the equalizer 502 uses a higher order modulation such as M-ary PSK or M-ary QAM and extends the JSV 504. This is useful with the GSM evolution, where EDGE incorporates 8PSK modulation, while in the more recent evolution, 16 and 32 QAM modulation were included. Two cases are considered in this particular discussion. The first case, considered next, involves a direct extension of the JSV 504 for binary modulation, where the bits x' and x belong to consecutive stages. The second case involves a situation where both bits x' and x are in the same stage, and this is discussed last.

Figure 10:
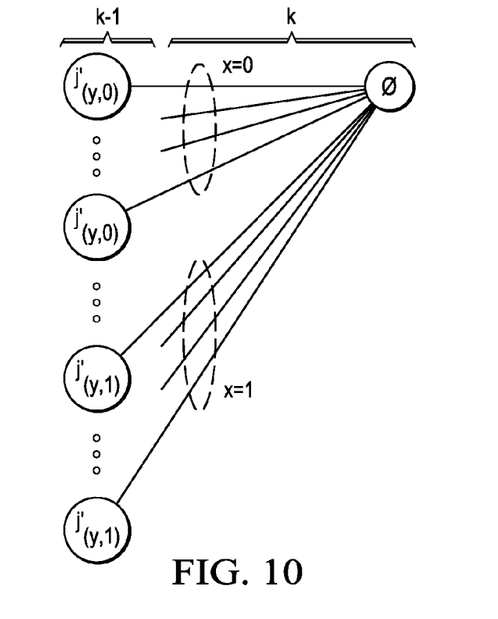
FIG. 10 is an illustration of an isolated piece of a trellis which is used to help describe how the receiver shown in FIGS. 5 and 7-9 and in particular the equalizer located therein generates joint soft values based on higher order modulation in accordance with an embodiment of the present invention.

In the first case, assume the modulation constellation has a size $Q=2^q$. In each stage, there are (q−1) bits which are not relevant for the purpose of the JSV 504. Thus, to help simplify the notation, the (q−1) bits are denoted as y, and the total q bits are denoted as (y,x), regardless of the position of x in the block of a bits. The key difference with the case q=1, is that one needs to deal with the bits y. This is done by minimizing over the values of y. Referring to FIG. 10, there is illustrated an isolated piece of a trellis showing the grouping of branches according to the bit of interest x where the other bits are labeled y. The starting state of the branch corresponding to (y,x) is denoted $j'_{(y,x)}$. In this example, each state $j'_{(y,x)}$ corresponds to a different y and the branches which are grouped according to the value of x are shown ending in state φ. Proceeding as in the binary case, let $E(\phi)=F_k(\phi)$, and then extend equation no. 6 as follows:

$$E'(x) = \min_y \{F_{k-1}(j'_{y,x}) + f_k(j'_{(y,x)}, \phi)\} \quad (19).$$

Then the state metric recursion equation no. 5 can be written as $$E(\phi) = \min(E'(0), E'(1)) \quad (20).$$

According to the cheap SOVA technique, the SSV for x is given by:

$$\lambda = E'(1) - E'(0) \quad (21).$$

Thus a negative (positive) value of λ indicates that x is 1 (0).

Now consider two consecutive stages, as in the binary case. In addition to x, the x' from the previous stage is also considered. The corresponding q information bits are denoted as (y',x'). At stage k−2, $j''_{(y',x',y,x)}$ is denoted as the starting state of the branch labeled (y',x') that leads to $j'_{(y,x)}$ at stage k−1. Equation no. 9 is now extended to define the four JSV components as follows:

$$E''(x', x) = \quad (22)$$
$$\min_y \{\min_{y'} \{F_{k-2}(j''_{(y',x',y,x)}) + f_{k-1}(j''_{(y',x',y,x)}, j'_{(y,x)})\} + f_k(j'_{(y,x)}, \phi)\}.$$

The new set of four values of E"(x',x) makes up the extended JSV 504 in accordance with an embodiment of the present invention. Like above, once the equalizer 502 outputs the extended JSV 504 it is not revisited latter again.

In the second case, the two bits of interest are mapped into the same symbol, and consequently appear in the same stage of the trellis. This can be viewed as a degenerate case, but it is discussed here for completion. The branches of the stage are labeled as (y,x',x), where y now includes the (q−2) bits which are not relevant to this discussion. The starting state at stage k−1 of the branch labeled (y,x',x) is denoted as $j'_{(y,x',x)}$. Then, the following can be written:

$$E''(x', x) = \min_{y}\{F_{k-1}(j'_{(y,x'',x)}) + f_k(j'_{(y,x',x)}, \phi)\}. \quad (23)$$

The four JSV 504 values are used in the same way as described above.

Decoder Variant for Producing OSV's

As discussed above, the traditional decoder is normally concerned with producing soft (or hard) values about information bits. However, in the present invention there is a decoder 508 which produces OSVs which are improved modem SSVs. This decoder variant is used in the enhanced decoder 506 but could also be useful in other contexts, such as "turbo equalization" and serial turbo codes. To illustrate how the decoder 508 generates OSVs which are improved modem SSVs an example of a punctured convolutional code is used. In particular, a MAP decoder is described which generates optimal SSVs, in the sense they are the exact likelihood ratios for the modem bits x', given the available information from the demodulator, and the knowledge of the code structure.

Punctured Code

Figure 11:
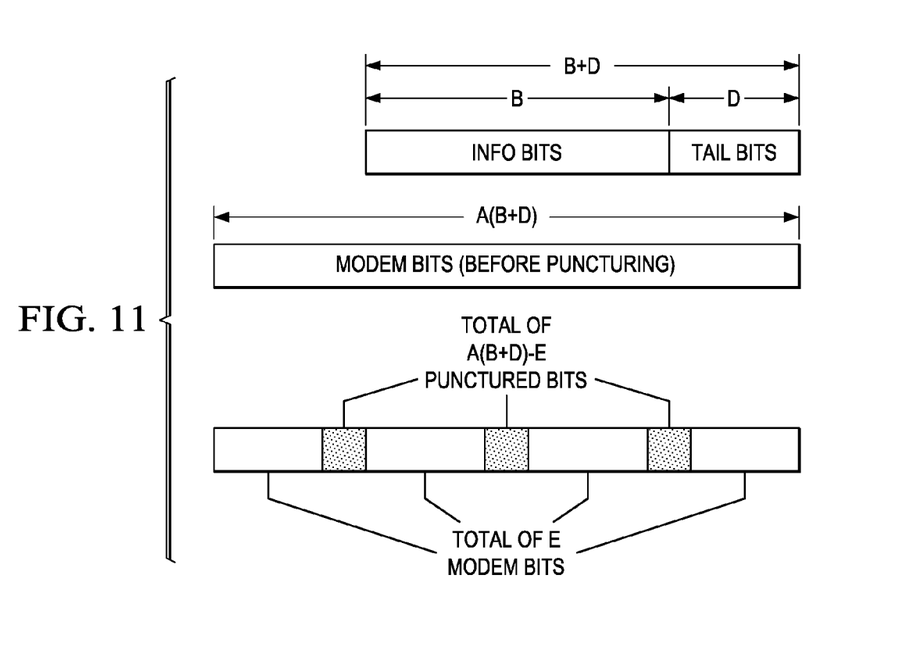
FIG. 11 is a diagram of an encoder operation which is used to help explain how the receiver shown in FIGS. 5 and 7-9 and in particular a decoder located therein functions in accordance with an embodiment of the present invention.

Punctured convolutional codes are known to provide an effective technique for adjusting the coding rate, while keeping a common core encoder and a common core decoder. In the following discussion, the encoder operation is described first and then a MAP decoder operation is described, and then an explanation is provided about the generation of the improved modem SSTs (OSVs). Referring to FIG. 11, there is a diagram illustrating the encoder operation which is provided to help explain the corresponding decoder operation in accordance with an embodiment of the present invention. In this drawing, the encoder first maps the B information bits and D tail bits into A(B+D) unpunctured modem bits and then outputs E modem bits after puncturing the A(B+D)−E bits. In particular, the punctured convolutional code is derived from a mother code, with no puncturing, where the mother code has a nominal rate 1/A and there where B information bits to be encoded are appended to D tail bits. Without much loss of generality, assume that the encoder starts and ends in state 0 and the D tail bits are all set to 0. The encoder for the mother code accepts one information bit at a time, and produces A modem bits at a time, for a total of A(B+D) bits. Of those, E modem bits will be actually produced. The remaining A(B+D)−E bits are punctured according to the puncturing table. The true rate of the punctured code is B/E. Without puncturing, the true rate is B/(A(B+D)).

Decoder for Punctured Code

In this discussion, assume that ISV's are in the log likelihood ratio form (LLR), or an approximation thereof. This makes it convenient to switch between LLRs and bit probabilities when describing the operation of the MAP decoder 508. In this example, the input probability of the modem bit being a 0 is denoted as $\epsilon$. In keeping with convention adopted earlier in equation no. 8, a positive (negative) LLR $\lambda$ indicates a 0 (1) and a zero LLR indicates the absence of information, in particular for punctured bits. The relation between $\lambda$ and $\pi$ is given by:

$$\lambda = \ln\left(\frac{\varepsilon}{1-\varepsilon}\right). \quad (24)$$

The decoder 508 first inserts A(B+D)−E zeros at the appropriate locations in the sequence of input modem SSVs to represent the bits punctured at the encoder. The resulting sequence has A(B+D) values, corresponding to the bits produced by the mother code encoder. From this point on, the decoder 508 considers the punctured code as being the mother code where no further special treatment for the punctured bits is needed since the punctured bits are reflected properly through the zero input SSVs within the decoder metric.

The decoder 508 operates over a trellis which describes the progression through a state space over the codeword length. The state space of the punctured convolutional code is constant throughout the codeword, with special allowance for termination. The state space is of size $2^D$. The trellis has (B+D) stages where each stage represents a single information bit, and an A-tuple of modem bits of the mother code. At each stage of the trellis, there are branches connecting starting states to ending states. A branch is interchangeable with the pair (c',c) of its starting and ending states, respectively. Each branch (c',c) has a label, which consist of a specific A-tuple of modem bits of the mother code. At stage k, for each state pair (c',c), a probability $\gamma_k(c',c)$ is computed from the A-tuple and the modem bit probabilities. For pairs (c',c) without branches, set $\gamma_k(c',c)=0$.

The MAP decoder 508 performs a forward recursion step, a backward recursion step, and a combining step to produce an output modem bit SSV. In contrast, the traditional MAP decoder performs the combining step to produces an output information bit SSV. The forward and backward recursions are unchanged in both the MAP decoder 508 and the traditional MAP decoder. The forward recursion is given by:

$$\alpha_k(c) = \sum_{c'} \alpha_{k-1}(c') \cdot \gamma_k(c', c). \quad (25)$$

The backward recursion is given by:

$$\beta_{k-1}(c') = \sum_{c} \beta_k(c) \cdot \gamma_k(c', c). \quad (26)$$

The initial conditions are given by:

$$\alpha_0(0)=1, \text{ and } \alpha_0(c)=0, c\neq 0 \quad (27).$$

$$\beta_{B+D}(0)=1, \text{ and } \beta_{B+D}(c)=0, c\neq 0 \quad (28).$$

Referring now to the combining step, consider a stage k of the trellis, which corresponds to A modem bits of the mother code. In the punctured code, some (possibly all) of the A modem bits are punctured at the encoder. In this discussion, the i-th modem is bit out of A is the focus assuming it was not punctured at the encoder because if it was punctured then it would be of no interest. The set $\Omega_0$ ($\Omega_1$) contains the branches (c',c) at stage k whose i-th bit label is equal to 0 (1). Then compute:

$$v_0 = \sum_{(c',c) \in \Omega_0} \alpha_{k-1}(c') \cdot \gamma_k(c', c) \cdot \beta_k(c) \quad (29)$$

and $$v_1 = \sum_{(c',c) \in \Omega_1} \alpha_{k-1}(c') \cdot \gamma_k(c', c) \cdot \beta_k(c). \quad (30)$$

For clarity, it should be noted that in a standard decoder, the combining step would focus on an information bit, as opposed to a modem bit, and that would be reflected in the formulation of $v_0$ and $v_1$.

Finally, the OSV 706, 806 and 906 is given by:

$$\tilde{\lambda} = \ln\left(\frac{v_0}{v_1}\right). \quad (31)$$

The SI 512 $\mu' = \tilde{\lambda} - \lambda$ reflects the structure of the code, which is embedded in the decoder 508.

Other Codes

In addition to the convolutional codes, the MAP decoder 508 can be used with turbo codes whose component codes are convolutional codes. The MAP decoder 508 may also be used for block codes, where the state space varies over the codeword length.

Further Interaction of the Decoder and the JSV

In one embodiment, it is possible to extend the interaction between the enhanced decoder 506 and the JSV 504 beyond what has been previously described. For instance, the extensions described in co-assigned U.S. Pat. No. 6,798,852 for joint probability may be adopted for JSV 504 in the present invention. The contents of the '852 patent are hereby incorporated herein by reference.

Hard Decision Side Information

There may be situations where the decoder 506 is only capable of producing a hard decision about x'. In this case, assume $\mu'$ as $+\infty$ to indicate that it overrides the other quantities. In other words, if $\mu'=+\infty$, indicating a strong bias to x'=1, then:

$$\hat{\lambda}=M'(1,1)-M'(1,0) \quad (32)$$

and if $u'=-\infty$, indicating a strong bias to x'=0, then:

$$\hat{\lambda}=M'(0,1)-M'(0,0) \quad (33).$$

Reversing Roles

It is also possible for the enhanced decoder 506 to use information about x to help x'. This may achieved by fusing side information about x with the same JSV's described earlier. In fact, the Viterbi equalizer 502 can be run backwards over the data (from L to 1 instead of 1 to L), which effectively reverses the role of x and x', in the sense that now x can be used to help x' in accordance with another aspect of the present invention.

Multiple Stages

It is possible to consider the JSV 504 for modem bits from non-neighboring stages, instead of k and k−1. As discussed above, joint probability reflects coupling between bits. In the context of GSM, this coupling is caused by the modulator, the dispersive channel and the receive filter. The coupling tends to die out very quickly as the separation between symbols increase. Since JSV 504 can be considered a proxy for joint probability, the same tendency will hold in this situation.

Multiple Bits

It is also possible to involve more than two bits in the JSV 504. For instance, it is possible to extract the JSV for groups of 3 bits (x",x',x) from the equalizer 502, and fuse side information about x" and x' with the 3 bit JSV to help x. The benefit to x would increase over that of the 2 bit JSV 504. However, there is a corresponding increase in complexity where the 3 bit JSV would be made up of 8 values, instead of 4 previously. Also the computations within the fusion function 510 would grow accordingly. Similarly, it is possible to extract a 4 bit JSV (x'",x",x',x) with 16 values from the equalizer 502, and fuse side information about x'",x" and x' with the 4 bit JSV to benefit x, and so on.

The present invention is a marked improvement over the traditional turbo receiver in which the decoder accepted SSV's from the equalizer and then fed back side information (SI) to the equalizer in an iterative process where the equalizer uses the SI to produce improved SSV's which are fed again to the decoder, and so on. In contrast, the receiver 500 of the present invention has a feedforward structure in which enriched information (JSV 504) flows from the equalizer 502 to the decoder 506. Since, the receiver 500 is feedforward it avoids the reuse of the equalizer 502 which addresses an undesirable feature of the traditional turbo receiver. In addition, the receiver 500 enhances the total receiver performance at a relatively small incremental cost in complexity.

From the foregoing, several exemplary enhanced receivers 500 have been described herein to provide a thorough understanding of the present invention. However, it will be apparent to one with ordinary skill in the art and having had the benefit of the present disclosure, that the present invention may be practiced in other embodiments which depart from the specific details disclosed herein. Moreover, descriptions of well-known devices, methods and materials have been omitted so as not to obscure the description of the present invention. And, although multiple embodiments of the present invention has been illustrated in the accompanying Drawings and described in the foregoing Detailed Description, it should be understood that the invention is not limited to the disclosed embodiments, but instead is also capable of numerous rearrangements, modifications and substitutions without departing from the spirit of the invention as has been set forth and defined by the following claims.

The invention claimed is:

1. A feedforward receiver for reducing inter-symbol interference in a received symbol, said receiver comprising:
   an equalizer that determines and outputs a joint soft value which includes joint information of a modem bit x and a previous modem bit x', wherein determining the joint soft value comprises computing the equation:

$E''(x',x)=F_{k-2}(j''_{x'x})=f_{k-1}(j''_{x'x}j'_x)=f_k(j'_x,\phi),$ wherein $E''(x',x)$ defines a cumulative metric candidate,
   $F_{k-2}(j''_{x'x})$ defines a cumulative metric for index k−2,
   k defines a time index,
   $f_{k-1}(j''_{x'x}j'_x)$ defines a branch metric at index k−1,
   $f_{k-1}(j'_x,\phi)$ defines a branch metric at index k;
   wherein x comprises a modem bit labeling a branch from stage k−1 to stage k,
   $\phi$ comprises a value corresponding to a best state at index k,
   $j'_x$ comprises a value corresponding to a state at index k−1,
   $j'_{x'x}$ comprises a value corresponding to a state at index k−2;

a fusion function that receives the joint soft value and outputs an input soft value for the previous modem bit x';

a decoder that receives the input soft value for the previous modem bit x' and outputs an output soft value for the previous modem bit x'; and a modification unit that uses the input soft value for the previous modem bit x' and the output soft value for the previous modem bit x' to generate side information which is in a form of a bias about the previous modem bit x';

wherein said fusion function receives the side information and processes the side information and the joint soft value to generate an improved single soft value for modem bit x.

2. The feedforward receiver of claim 1, further comprising a deinterleaver located between the equalizer and the fusion function where the deinterleaver changes indices in the modem bits x and x'.

3. The feedforward receiver of claim 1, wherein the modification unit is a subtraction unit that subtracts the input soft value for the previous modem bit x' from the output soft value for the previous modem bit x' to generate side information which is in the form of the bias about the previous modem bit x'.

4. The feedforward receiver of claim 1, wherein the equalizer uses a cheap Soft Output Viterbi Algorithm (SOVA) technique to generate the joint soft value.

5. The feedforward receiver of claim 1, wherein the equalizer uses a SOVA technique to generate the joint soft value.

6. The feedforward receiver of claim 1, wherein the previous modem bit x' and the modem bit x belong to a same codeword.

7. The feedforward receiver of claim 1, wherein the previous modem bit x' belongs to a first codeword and the modem bit x belongs to a second codeword.

8. The feedforward receiver of claim 1, wherein the previous modem bit x' belongs to a first codeword and the modem bit x is uncoded.

9. The feedforward receiver of claim 1, wherein the equalizer generates and forwards the input soft value for the previous modem bit x' to the fusion function.

10. The feedforward receiver of claim 1, wherein the equalizer generates the joint soft value based on binary modulation, M-ary PSK modulation, or M-ary QAM modulation, wherein M is a positive integer.

11. The feedforward receiver of claim 1, wherein the decoder is a Maximum A Posteriori (MAP) decoder which uses a forward recursion, a backward recursion and a combining step to produce the output soft value for the previous modem bit x'.

12. The feedforward receiver of claim 1, wherein the decoder uses a punctured convolutional code to generate the output soft value for the previous modem bit x'.

13. The feedforward receiver of claim 1, wherein the decoder uses a turbo code to generate the output soft value for the previous modem bit x'.

14. The feedforward receiver of claim 1, wherein the decoder uses a block code to generate the output soft value for the previous modem bit x'.

15. The feedforward receiver of claim 1, wherein the equalizer uses the modem bit x and the previous modem bit x' which are from neighboring stages to generate the joint soft value.

16. The feedforward receiver of claim 1, wherein the equalizer uses the modem bit x and the previous modem bit x' which are from non-neighboring stages to generate the joint soft value.

17. The feedforward receiver of claim 1, wherein the modification unit generates side information which is in a form of a bias about the modem bit x instead of the previous modem bit x', and the fusion function receives the side information and processes the side information and the joint soft value to generate an improved single soft value for the previous modem bit x' instead of the modem bit x.

18. A method for reducing inter-symbol interference in a received symbol, said method comprising the steps of:

generating a joint soft value which includes joint information of a modem bit x and a previous modem bit x' using an equalizer, wherein generating the joint soft value comprises computing the equation:

$$E''(x',x) = F_{k-2}(j''_{x',x}) = f_{k-1}(j''_{x',x}, j'_x) = f_k(j'_x, \phi),$$

wherein $E''(x',x)$ defines a cumulative metric candidate, $F_{k-2}(j''_{x',x})$ defines a cumulative metric for index k−2, k defines a time index, $f_{k-1}(j''_{x',x}, j'_x)$ defines a branch metric at index k−1, $f_k(j'_x, \phi)$ defines a branch metric at index k;

wherein x comprises a modem bit labeling a branch from stage k−1 to stage k, $\phi$ comprises a value corresponding to a best state at index k, $j'_x$ comprises a value corresponding to a state at index k−1, $j''_{x',x}$ comprises a value corresponding to a state at index k−2; and using the joint soft value and side information which is in a form of a bias about the previous modem bit x' or the modem bit x to respectively generate a single soft value for the modem bit x or the previous modem bit x'.

19. The method of claim 18, wherein the equalizer is not used again during the using step in which a decoder is used to generate the single soft value for the modem bit x or the previous modem bit x'.

20. The method of claim 18, wherein the generating step further includes using a cheap SOVA technique or a SOVA technique to generate the joint soft value.

21. The method of claim 18, wherein the generating step further includes generating the joint soft value based on binary modulation, M-ary PSK modulation, or M-ary QAM modulation.

22. The method of claim 18, wherein the generating step uses the modem bit x and the previous modem bit x' which are from neighboring stage.

23. The method of claim 18, wherein the generating step uses the modem bit x and the previous modem bit x' which are from non-neighboring stages.

24. The method of claim 18, wherein the joint soft value includes joint information of multiple modem bits ( . . . , x'',x',x), with side information for each of previous modem bits ( . . . , x'',x') being fused with the multiple modem bit joint soft value to benefit the last modem bit x.

* * * * *

UNITED STATES PATENT AND TRADEMARK OFFICE
CERTIFICATE OF CORRECTION

PATENT NO. : 8,229,040 B2
APPLICATION NO. : 12/342470
DATED : July 24, 2012
INVENTOR(S) : Khayrallah It is certified that error appears in the above-identified patent and that said Letters Patent is hereby corrected as shown below:

In the Specifications:

In Column 2, Line 19, delete "deinterlcaver" and insert -- deinterleaver --, therefor.

In Column 2, Line 56, delete "Such" and insert -- such --, therefor.

In Column 4, Line 2, delete "$\lambda_{k-1}(j), \pi_{k-2}(\lambda_{k-1}(j)),$" and insert -- $\pi_{k-1}(j), \pi_{k-2}(\pi_{k-1}(j)),$ --, therefor.

In Column 4, Line 49, delete "A" and insert -- $\lambda$ --, therefor.

In Column 5, Line 56, delete "invention" and insert -- invention; --, therefor.

In Column 6, Line 20, delete "leave" and insert -- have --, therefor.

In Column 6, Line 54, delete "X'" and insert -- x' --, therefor.

In Column 7, Line 65, delete "X'" and insert -- x' --, therefor.

In Column 8, Line 44, delete "is which" and insert -- which --, therefor.

In Column 9, Line 48, delete "feeds is" and insert -- feeds --, therefor.

In Column 11, Line 38, delete "SSTs (OSVs)." and insert -- SSVs (OSVs). --, therefor.

In Column 12, Line 63, after "modem" delete "is".

Signed and Sealed this
Sixteenth Day of April, 2013

Teresa Stanek Rea
*Acting Director of the United States Patent and Trademark Office*

CERTIFICATE OF CORRECTION (continued)
U.S. Pat. No. 8,229,040 B2

In the Claims:

In Column 16, Line 19, in Claim 18, delete "$E''(x',x)=F_{k-2}(j''_{x',x})=f_{k-1}(j''_{x',x},j'_x)=f_k(j'_x,\phi),$" and insert -- $E''(x',x) = F_{k-2}(j''_{x',x}) + f_{k-1}(j''_{x',x}, j'_x) + f_k(j'_x, \phi),$ --, therefor.